April 2, 1946.  L. KAPHAN  2,397,743
ORNAMENTAL FABRIC AND METHOD OF PRODUCTION
Filed June 17, 1944
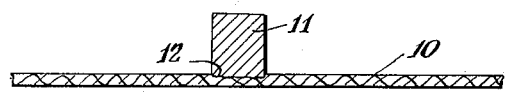
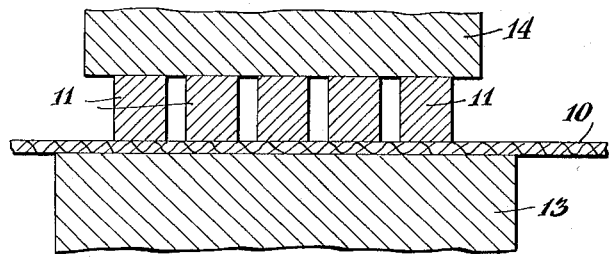
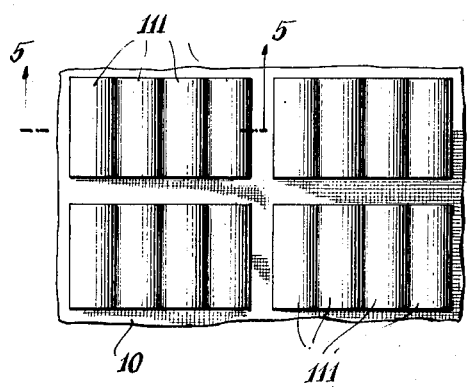
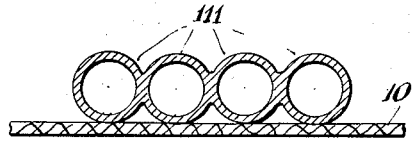
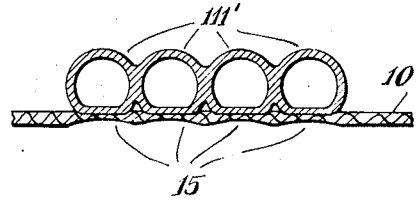
INVENTOR.
Ludwig Kaphan
BY
Watson, Bristol, Johnson & Leavenworth
ATTORNEYS Patented Apr. 2, 1946

2,397,743

UNITED STATES PATENT OFFICE 2,397,743

ORNAMENTAL FABRIC AND METHOD OF PRODUCTION

Ludwig Kaphan, Brooklyn, N. Y.

Application June 17, 1944, Serial No. 540,838

5 Claims. (Cl. 41—34)

This invention relates to the art of uniting articles to fabrics, and has for an object the production of improved composite articles, more particularly ornamental fabrics. A further object of the invention is the provision of an economical and readily made ornamental fabric having a plurality of segregated ornamental thermoplastic units arranged on a flexible fabric backing, and heat-bonded thereto. Another object of the invention is the provision of a simple and efficient method of making such ornamental fabrics characterized by arrangement of preformed thermoplastic units on a flexible fabric backing, and the application of heat to the units through the fabric effectively to secure them thereto.

Other objects of the invention will in part be obvious and will in part appear hereinafter.

The invention accordingly comprises the several steps and the relation of one or more of such steps with respect to each of the others, and the article possessing the features, properties, and the relation of elements, which are exemplified in the following detailed disclosure, and the scope of which invention will be indicated in the claims.

For a fuller understanding of the nature and objects of the invention reference should be had to the following detailed description taken in connection with the accompanying drawing, in which:

Fig. 1 shows an exaggerated section of a thermoplastic unit bonded to a fabric backing in accordance with the present invention;

Fig. 2 diagrammatically shows an apparatus suitable for carrying out the method of the present invention;

Fig. 3 is a top plan view showing an embodiment of the invention comprising a flexible fabric backing covered with segregated thermoplastic units;

Fig. 4 shows a section of a multi-cylindrical thermoplastic decorative unit before it has been bonded to the fabric in accordance with the present invention; and Fig. 5 is a section similar to Fig. 4, showing the elements after the units have been bonded to the fabric.

The usual method heretofore of ornamenting fabrics where preformed plastic units are used has been either to apply the units to the fabric by sewing, or to paste the units to the surface of the fabric by an adhesive or cement. These methods sometimes fail to hold the units attached and involve more labor than the present method. According to the present invention a preformed unit of thermoplastic material which is usually rigid or substantially rigid is placed on a face of the fabric in the desired position and heat is applied to the fabric on its reverse side with concurrent or subsequent use of pressure. The heat penetrates the fabric and temporarily softens the thermoplastic material next to the fabric and the pressure forces part of the material into and between the threads of the fabric thus uniting or bonding the units to the fabric when the plastic sets upon cooling.

Referring to the drawing, in which like numerals refer to like parts throughout, it will be seen that a flexible permeable backing 10, such as the fabrics cotton, linen, or the like, has thermoplastic units 11—11 on it. Any thermoplastic material may be used for the units as, for example, the cellulose derivative plastics, especially cellulose acetate. An integral portion 12 of the thermoplastic unit is bonded with the flexible fabric backing by practice of the method of the present invention.

In the manufacture of the ornamental fabric, the preformed segregated thermoplastic units 11—11 are arranged in the positions in which the maker desires them to be finally located on the flexible fabric backing 10. The thermoplastic units are bonded to the fabric by heat applied through the fabric such as by a heated backing plate 13 to soften the portion of the units adjacent the fabric and by pressure applied while such portion is still soft in any suitable manner such as by forcing the backing plate 13 and a pressure plate 14 towards each other. The thermoplastic units may desirably be hollow structures as, for example, one or more hollow cylinders 111, and when heat-softened in the fabric-contacting areas they may be partly flattened as shown at 111'—111' in Fig. 5 by applied pressure to form larger areas of contact 15—15 with the fabric without causing any undesirable distortion of the visible faces of the applied units. Obviously the backing and the thermoplastic materials must be properly chosen with respect to their relative properties. The amount of heat and pressure required are only such as to soften the thermoplastic in the area where bonding to the fabric is desired to make it penetrate the fabric sufficiently to bond with the fabric upon cooling, without damage to the fabric or undesired softening and distortion of the parts of the plastic units which are to be exposed to view. As an example I have found that cellulose acetate units such as those shown in Figs. 3, 4, and 5 may be bonded to the face of a fabric such as muslin by applying to the reverse of the fabric a flat-iron heated and pressed as in laundry use for a period of a few seconds.

The invention is adapted to the attachment to fabrics of single or multiple thermoplastic ornaments as well as buttons or other plastic fasteners which, for the purpose of this invention, are to be included in the terms "units" or "decorative units." The invention is also adapted for producing either custom made bags (bags fabricated under the direction of the customer who selects the desired design to be put on the bag) as well as for producing bags in mass production (bags in which the designs are selected ahead of time and put together either by hand or machinery in large numbers). The fabric or other permeable backing used for the invention may preferably be flexible and will then retain such flexibility in the areas which are not bonded to the decorative units. Where flexibility is particularly desired the units may be articulated by spacing the units slightly, or each unit left partly unbonded by applying the heat and pressure to only part of the area where the unit touches the fabric.

Since certain changes in carrying out the above method, and certain modifications in the article which embody the invention may be made without departing from its scope, it is intended that all matter contained in the above description, or shown in the accompanying drawing, shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patents, is:

1. An articulate ornamental fabric comprising a flexible fabric backing and a plurality of substantially rigid preformed segregated decorative units of thermoplastic material heat-bonded directly thereto at spaced intervals.

2. The method of making an articulate ornamental fabric comprising arranging a plurality of rigid preformed ornamental thermoplastic units upon a flexible fabric backing and bonding the units to the fabric only, at spaced intervals by application of heat to the units through the fabric while pressing the units thereon.

3. The method of making an ornamental fabric comprising arranging preformed hollow ornamental thermoplastic units upon a flexible fabric, bonding the units to the fabric by the application of heat to the units through the fabric while pressing the units thereon, and partly deforming the heat-softened units by the pressure to increase the contact areas and extent of the resultant bonds between the units and the fabric.

4. The method of making an ornamental fabric comprising arranging preformed hollow ornamental thermoplastic units upon a flexible fabric, bonding the units to the fabric by the application of heat to the units through the fabric while pressing the units thereon, and deforming areas of the heat-softened units adjacent the fabric by the pressure to increase the contact areas and extent of the resultant bonds between the units and the fabric without substantially deforming the exposed surfaces of said units.

5. The method of making an ornamental fabric comprising arranging preformed hollow ornamental thermoplastic units upon a flexible fabric, bonding the units to the fabric by the application of heat through the fabric to part only of the surface of the unit adjacent the fabric.

LUDWIG KAPHAN.